Figure 2:
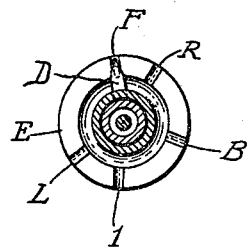

No. 838,228. PATENTED DEC. 11, 1906.
T. E. WILLIAMS.
CHAIR TRUCK AND SELF CONTAINED PROPELLING MEANS THEREFOR.
APPLICATION FILED OCT. 11, 1905.

4 SHEETS—SHEET 1.

WITNESSES:
S. C. Duvall.
H. R. Marlatt.

T. E. WILLIAMS,
INVENTOR.
BY Robert W. Randle
ATTORNEY.

No. 838,228. PATENTED DEC. 11, 1906.
T. E. WILLIAMS.
CHAIR TRUCK AND SELF CONTAINED PROPELLING MEANS THEREFOR.
APPLICATION FILED OCT. 11, 1905.

4 SHEETS—SHEET 2.

WITNESSES:
S. C. Duvall.
H. R. Marlatt.

T. E. WILLIAMS,
INVENTOR.
BY
ATTORNEY.

No. 838,228. PATENTED DEC. 11, 1906.
T. E. WILLIAMS.
CHAIR TRUCK AND SELF CONTAINED PROPELLING MEANS THEREFOR.
APPLICATION FILED OCT. 11, 1905.

4 SHEETS—SHEET 3.

WITNESSES:
S. C. Duvall.
H. R. Marlatt.

T. E. WILLIAMS,
INVENTOR.
BY Robert H. Raudle
ATTORNEY.

No. 838,228. PATENTED DEC. 11, 1906.
T. E. WILLIAMS.
CHAIR TRUCK AND SELF CONTAINED PROPELLING MEANS THEREFOR.
APPLICATION FILED OCT. 11, 1905.
4 SHEETS—SHEET 4.
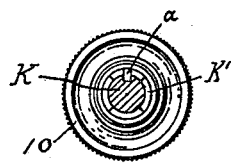
Fig. 11.
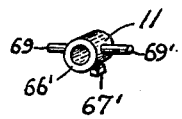
Fig. 12.
Fig. 13.
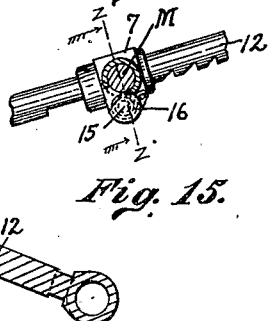
Fig. 15.
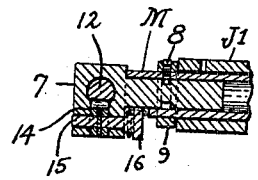
Fig. 14.
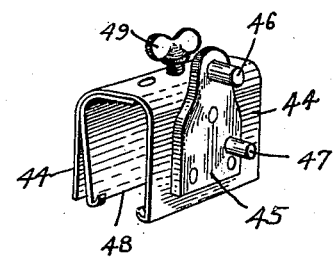
Fig. 16.
Fig. 17.
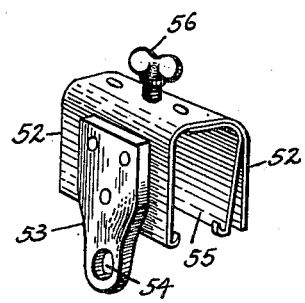
Fig. 18.
WITNESSES:
S. C. Duvall.
H. R. Marlatt.
T. E. WILLIAMS,
INVENTOR.
BY
ATTORNEY.

UNITED STATES PATENT OFFICE.

THOMAS E. WILLIAMS, OF GREENFIELD, INDIANA.

CHAIR-TRUCK AND SELF-CONTAINED PROPELLING MEANS THEREFOR.

No. 838,228.   Specification of Letters Patent.   Patented Dec. 11, 1906.

Application filed October 11, 1905. Serial No. 282,223.

*To all whom it may concern:*

Be it known that I, THOMAS E. WILLIAMS, a citizen of the United States, residing in Portland, in the county of Jay and State of Indiana, have invented certain new and useful Improvements in Chair-Trucks and Self-Contained Propelling Means Therefor, of which the following is a specification, which when taken in connection with the accompanying drawings, forming a part thereof, will be found sufficiently clear and concise as to enable others skilled in the art to which it appertains to make and use the same.

The object of my present invention, broadly speaking, is to provide a chair-truck having propelling means therefor composed of coöperating interdependent, and subsidiary mechanical elements arranged and combined to subserve the highest economic ends, having a minimum of mechanical parts, and which will be simple in construction and easy of operation.

Another object is the provision of a chair-truck having self-contained propelling means therefor which will be strong and durable in construction, symmetrical and attractive in appearance, easily operated and controlled, capable of wide scope of usefulness and efficiency, and which can be manufactured and sold at a comparatively low price.

A more specific object is to provide an invalid-chair capable of universal use, either as an ordinary rocking-chair or for manipulations as a perambulator for movements either forward and backward or to the right or left, and means initiating and controlling the operations by the employment of a single lever operative at the will of the occupant of the chair; and, finally, another object is to so construct a chair-truck that it may be adjusted to carrying various sizes of ordinary rocking-chairs thereon, whereby the chair may be used in connection therewith as an ordinary rocker, with means controlled by the occupant whereby the chair may be moved about in any direction at will and having means whereby the truck may be packed in a case occupying a small compass of space for storage or transportation.

Other objects and particular advantages will appear in the course of the ensuing specification, from the drawings forming a part thereof, and as set forth in the claims hereunto appended.

For a more thorough exposition of my invention I will now take up the description of my invention in concrete detail, and I will describe and set forth my invention and its operation as briefly and compactly as I may.

One manner of carrying out this invention, and that which in practice has been found to be the most desirable, is illustrated in the accompanying drawings, in which—

Figure 3:
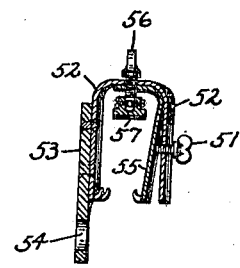
Figure 1:
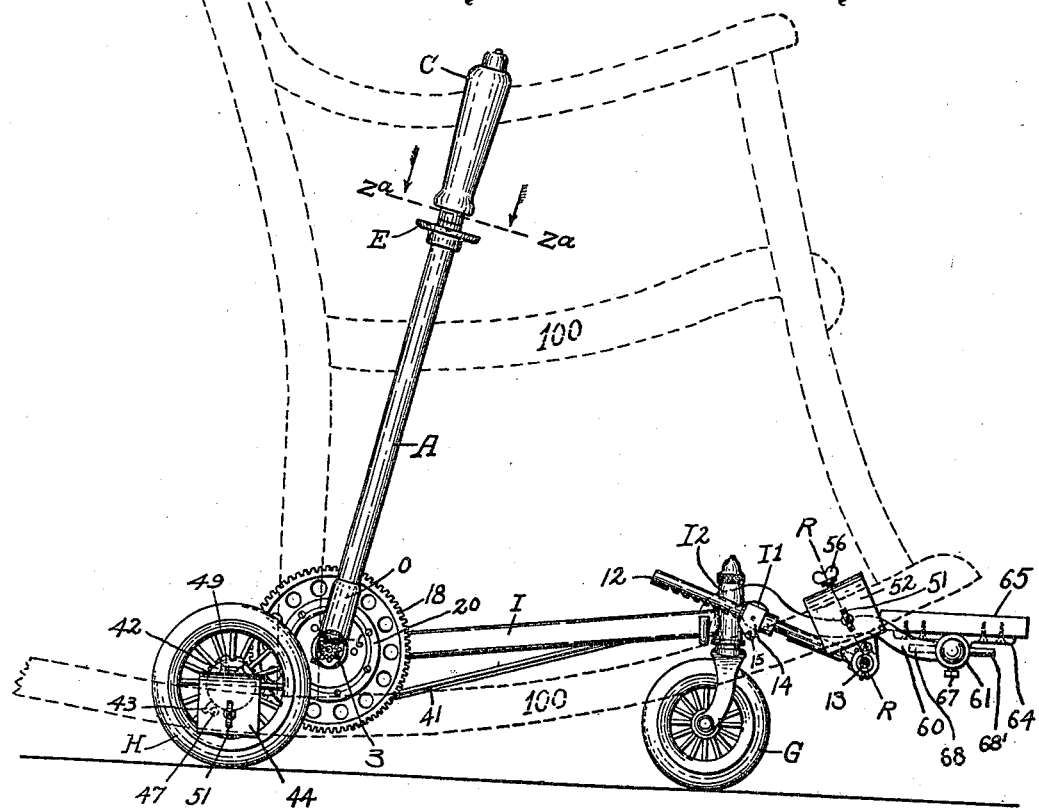
Figures 4, 5, 6:
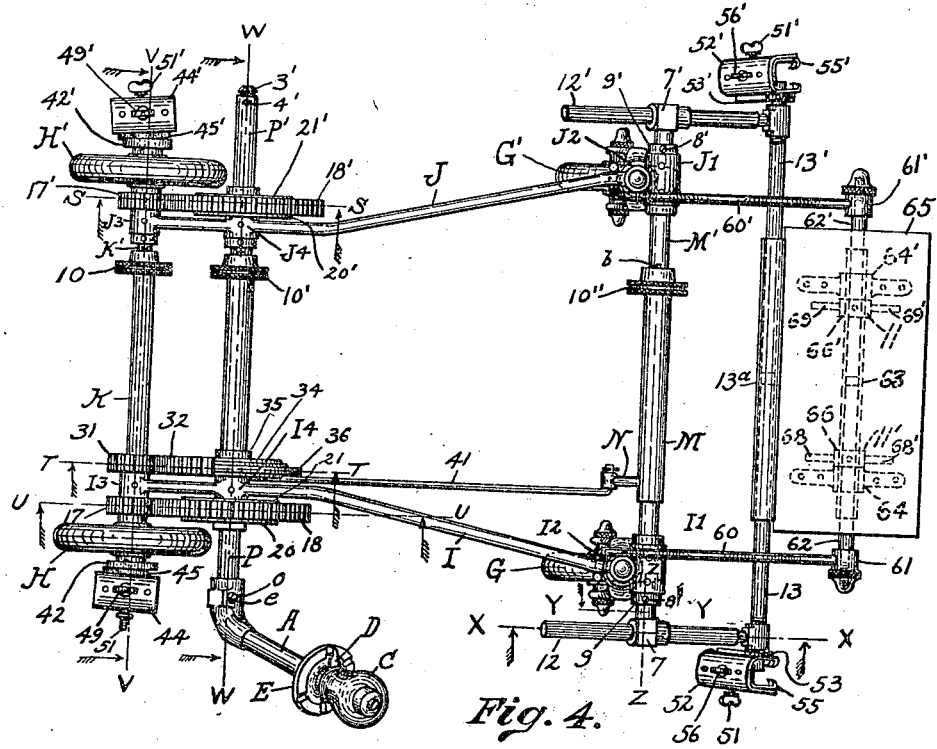
Figure 7:
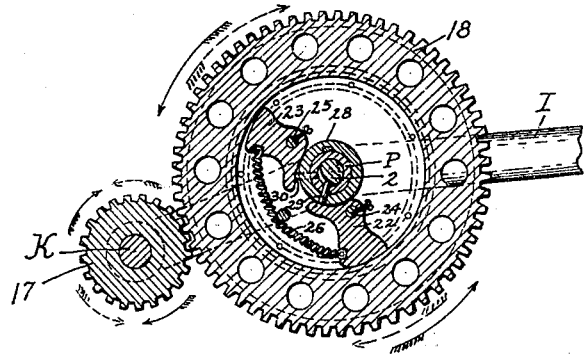
Figure 10:
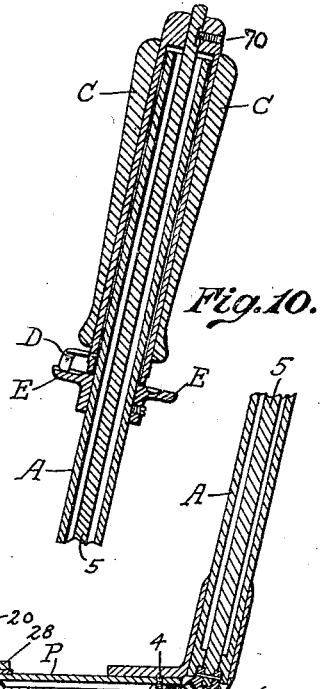
Figure 8:
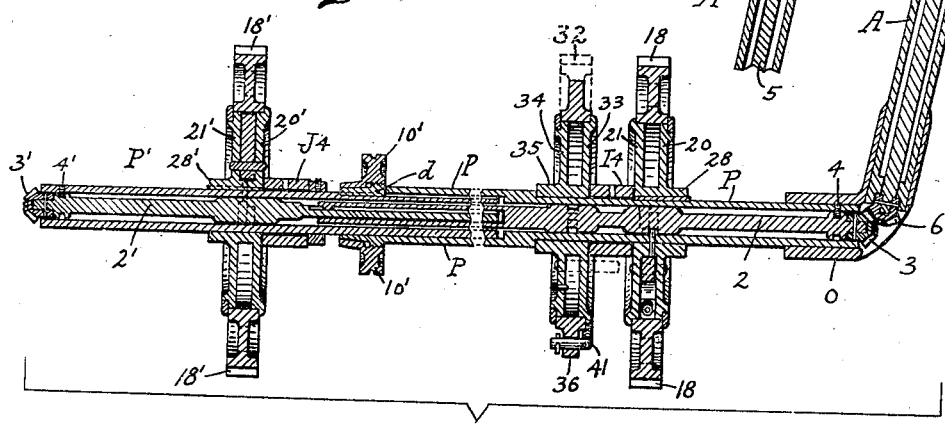
Figure 9:
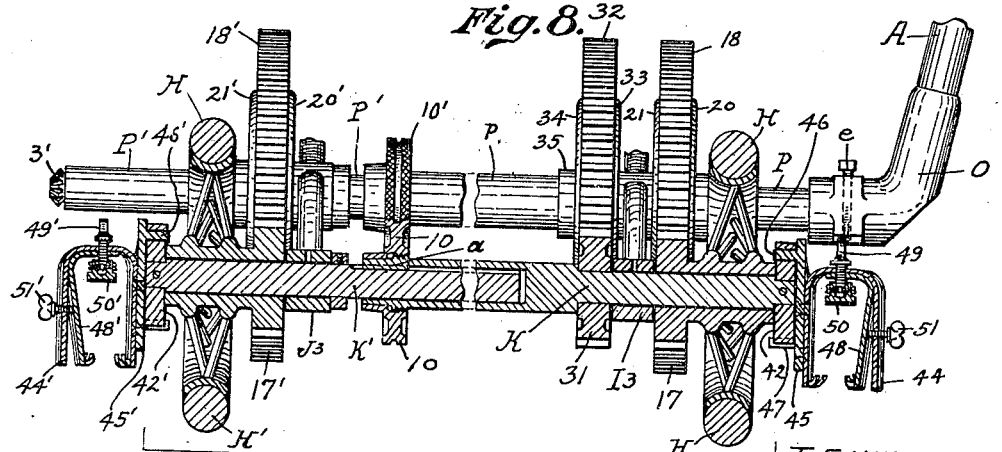

Sheet 1: Figure 1 is a side elevation of my invention, showing in dotted lines a chair mounted thereon. Fig. 2 is a plan view of the face of the dial for indicating various movements, taken on the line $Z^a Z^a$ of Fig. 1. Fig. 3 is a detail view, in vertical section, of one of the front hangers, taken on the line R R of Fig. 1. Sheet 2: Fig. 4 is a top plan view of my entire invention complete. Fig. 5 is a detail view, partly in section, taken on the line S S of Fig. 4, showing the parts enlarged and taken in the direction of the arrows. Fig. 6 is a detail sectional view taken on the line T T of Fig. 4, showing the parts enlarged and taken in the direction of the arrows. Sheet 3: Fig. 7 is a detail sectional view taken on the line U U of Fig. 4, showing the parts enlarged and taken in the direction of the arrows. Fig. 8 is a sectional view taken on the line W W of Fig. 4 and taken in the direction of the arrows. Fig. 9 is a view, partly in section, of the rear mechanism, the section being taken on the line V V of Fig. 4 and being taken in the direction of the arrows. Fig. 10 is a central detail sectional view of the handle and the upper portion of the operating-lever. Sheet 4: Fig. 11 is a detail elevation of one of the thumb-nuts for securing the adjustment laterally of the mechanism as shown in Figs. 4 and 9. Fig. 12 is a detail perspective view of one of the collars shown in dotted lines in Fig. 4. Fig. 13 is a perspective view of one of the brackets for the foot-rest as shown in dotted lines in Fig. 4. Fig. 14 is a detail sectional view taken on the line X X of Fig. 4 and taken in the direction of the arrows. Fig. 15 is a detail elevation taken on the line Y Y of Fig. 4. Fig. 16 is a detail sectional view taken on the line Z Z of Figs. 4, 14, and 15. Fig. 17 is a perspective view of one of the rear hangers for the chair, and Fig. 18 is a perspective view of one of the front hangers for the chair.

Similar reference characters denote like parts throughout the several views of the drawings.

In this invention is devised means for the attainment of six distinct movements by the operation of the single lever A, each movement being predetermined by the rotation of the handle C to bring the pointer D to the desired indicating-point on the dial E, as "1," denoting the point for raising and lowering the chair carried by the invention; to "F," denoting the point for moving the invention and chair forward; to "B," denoting the point for moving the device and chair backward; to "R," denoting the point where the chair and the device may be moved forward and to the right, and to "L," denoting the point where the chair and the device may be moved forward and to the left.

The above-named movements are given first in this specification, as they are, in fact, the desideratum to which the various mechanisms lead and which will now be described in detail.

My invention is mounted on four rubber-tire traction-wheels divided into two pairs, the characters G and G' denoting the front pair of wheels and the characters H and H' the rear pair of wheels, right and left, respectively.

The letters I and J denote the two side bars of the frame of the invention, right and left, respectively, their rear portions being arranged parallel with each other and then diverging apart, terminating at their front ends in double journals or hangers, the horizontal hanger I' and the vertical hanger I² being integral with the bar I and the horizontal hanger J' and the vertical hanger J² being integral with the bar J.

The wheels G and G' are mounted between forks, each pair of forks terminating in an upwardly-projecting pivot, which is revoluble in the respective vertical hangers I² and J², as shown most clearly in Fig. 1. Integrally united with the rear ends of the side bars I and J are the horizontal journal-hangers I³ and J³, respectively, in which is mounted the extendible two-part shaft K K', the part K' being adapted to telescope into the part K, as shown in Fig. 9, and being adapted to be located at any desired point by the thumb-nut 10. The members K and K' are caused to rotate together by reason of the key $a$, which rests in key-channels formed in an axial direction in and between the members K and K'. The wheels H and H' are mounted on the shaft K K' outside the hangers J³ and I³, as shown.

Mounted in and connecting the hangers I' and J' is the extendible shaft M M', the part M' being adapted to telescope into the part M, similar to that of the shaft K K' above described, and being adapted to be locked at any desired point by the thumb-nut 10". The members M and M' are caused to rotate together by reason of the key $b$ resting in key-channels formed in an axial direction in and between the members M and M'. Integral with and extending out from the member M of said front axle is the arm N, having a horizontal journal-bearing, the purpose of which will presently be explained herein.

Somewhat in front of the hangers I³ and J³, also integral with the side bars I and J, respectively, are the horizontal hangers I⁴ and J⁴, respectively, in which is mounted the extendible two-part hollow shaft P P', the part P' being adapted to telescope into the part P, as shown in Fig. 8, and being adapted to be secured at any desired point by the thumb-nut 10'. The members P and P' are caused to rotate together by reason of the key $d$ resting in key-channels formed in an axial direction in and between the members P and P'.

The lever A is formed hollow throughout its length and on its lower end is attached the angular fitting O, which is adapted to be secured over the outer end of either the member P or P' by means of a set-screw, as shown, or otherwise. Extending through the shaft P P' is a two-part extendible shaft 2 2', the member 2' thereof being adapted to telescope into the member 2, which latter has a square longitudinal aperture extending from its inner end to the right some distance to receive the square end portion of the former or otherwise, whereby they are formed extendible, but will rotate together, actuated either one by the other. Secured on the outer end of the member 2 is the miter-gear 3, facing outward with its base contacted with the end of the member P, where it is held by the screw 4, which latter extends into a threaded aperture therefor in the member P, its point being adapted to engage in a channel therefor formed in the enlarged portion of the member 2 at that point which is near the outer end of the latter, as shown in Fig. 8. In like manner secured on the outer end of the member 2' is the miter-gear 3', facing outward with its base contacted with the end of the member P', where it is held by the screw 4', which latter extends into a threaded aperture therefor in the member P', its point adapted to engage in a channel formed in the enlarged portion of the member 2', formed near the outer end of the latter, as shown in Fig. 8.

Extending through the lever A is the shaft 5, as shown in Figs. 8 and 10, the upper end thereof being secured to the handle C by the screw 70, as shown in Fig. 10, and on the lower end of the shaft 5 is secured the miter-gear 6, facing outward with its base contacted with the lower end of the lever A, as shown in Fig. 8, and from the above it will be apparent when the lever is secured in place on either end of the shaft P P' that by rotating the handle C the shaft 2 2' may be revolved in either direction and the dial E being secured around and to the lever A just below the lower end of the handle C and the pointer D being extended out from the lower end of the handle C over said dial that the location of the shaft 2 2' revolubly may be determined from said dial and pointer. The pointer D is made of a resiliency such that its point may be turned down and adapted to press into the grooves formed in the face of the said dial, which points or depressions correspond to the points indicated by the characters "F," "R," "B," "L," and "1," where said points of movement are readily ascertained and whereby the pointer may be retained at the point desired.

Pivotedly mounted on the ends of the shaft M M' are the heads 7 and 7', with their stems extending into the interior of said shaft and secured by the respective screws 8 and 8', which screws pass through the respective collets 9 and 9' and through the members M and M', with their points adapted to travel in a channel formed around the stems of the heads 7 and 7', by which it is apparent that said heads may be revolved independent of the shaft and also that the shaft may be revolved and held from endwise movements by said collets, as shown in Fig. 16. A round aperture is formed through each of the heads 7 and 7' in a direction at right angles to the shaft M M' to receive the respective arms 12 and 12', which arms are adapted to slide back and forth therein. In the forward ends of the arms 12 and 12' are formed heads with eyes at right angles thereto formed therethrough to receive the two-part hollow rod 13 13', which parts are adjustably connected by the ferrule 13ª, inclosing their inner portions, as shown in Fig. 4. Pivotedly mounted on the under side of the heads 7 and 7' are the respective pawls 14 and 14', (shown in Figs. 1, 14, and 16,) their points entering the curvature of the arm-apertures in the heads 7 and 7', and on the under side of the said arms 12 and 12' are formed a plurality of ratchet-teeth, with which the points of the respective pawls 14 and 14' may engage to prevent said arms from extending outward farther than desired, as shown most clearly in Fig. 14. Said pawls are normally retained in contact with said teeth by coil-springs acting on the pivots 15 and 15' of the respective pawls, said pivots being integral with their respective pawls and being carried in hangers extending down from the respective heads 7 and 7', as shown. The inner ends of the pivots 15 and 15' each terminate in an eccentric head 16 and 16', respectively, as shown in Figs. 15 and 16, which are adapted to travel around the peripheries of the outer ends of the shaft M M', whereby the respective pawls are kept out of engagement with the teeth formed in the arms 12 and 12'; but a portion of the periphery of each of the members M M' is cut away where the heads 16 and 16' travel, whereby as the members revolve the pawls will at these cut-away points be allowed to engage said teeth and at other times be disengaged therefrom as the shaft is rotated. The means for rotating the shaft formed by the members M M' for engaging or disengaging the said pawls will presently be fully explained.

Located concentric with and extending inward from the hubs of the wheels H and H', to which they are connected and revoluble therewith on the axle K K', are the respective pinions 17 and 17', which of course revolve continuously when the device is in motion forward or backward or to the right or left. At this point it should be noticed, if not previously, that throughout the drawings the invention is shown as being in position to accomplish the forward movement of the mechanism when the lever A is moved back and forth, and the other movements will be made manifest in their proper sequence in the latter portion of this specification.

Mounted on the shaft P P', immediately outside the side bars I and J, are the respective clutch-gears (designated by characters 18 and 18') and which are of novel construction. Being identical with each other, a description of one will answer for both, the corresponding parts on the left being designated by similar numerals with exponents, and they are describable as follows: Referring particularly to Figs. 7 and 8, it will be seen that the central portion of the gear 18 is cut away, and the space formed thereby is inclosed by the two oppositely-disposed plates 20 and 21, right and left, respectively. Said plates are integrally united with each other by the hub 28, which hub is keyed to the shaft P P', as shown in Fig. 8, by which it will be seen that the hub 28 and the plates 20 and 21 revolve with the shaft P P', while the gear 18 is free to revolve on the peripheries of said plates in a channel formed therefor, as shown in Fig. 8. Pivotedly mounted in the interior space between the plates 20 and 21 are the two oppositely-disposed dogs 22 and 23, which are mounted on their respective pivots 24 and 25, which pivots extend across between the plates 21 and 22, one face of each of said dogs being adapted to be connected with the inner edge of the gear 18 and the other face of each dog being adapted to contact with the periphery of the hub 28. Said dogs are resiliently connected near their outer faces by the helical spring 26, whereby their faces are held normally in contact with the periphery of the hub 28 and their outer faces in actuating contact with the inner edge of the gear 18.

Formed through the hub 28 and the member P in a direction at right angles to the axial direction thereof are two pin-apertures located at almost right angles with reference to each other and extending in immediately from the inner points of the dogs 22 and 23, in which apertures are loosely positioned the pins 29 and 30, their outer ends being held normally flush with the periphery of the hub 28 by the resiliency of the spring 26. At this point the member 2 is enlarged to almost the capacity of the interior of the member P in which it is contained, and in the portion of said enlargement opposite said pins is formed a crescent-shaped channel (shown in Fig. 7) through which the inner ends of said pins travel when the member 2 is revolved, whereby said pins may be caused to impinge or release said dogs for causing them to release or engage the inner edge of the gear.

By the above it will be seen that by revolving the member 2 the outer ends of said pins may be moved into or out of engagement with the dogs and that when the pin 30 is moved out it will cause the dog 23, with which it impinges, to be moved, whereby its outer face portion will be disengaged from the inner edge of the gear 18 and by which the gear 18 may be revolved by the dog 22 in the direction indicated by the solid arrows shown in Fig. 7, being actuated ratchet-like by the lever A, and should the shaft 2 be now rotated to another point a reverse movement may be set up—that is, the pin 30 will enter the crescent channel and the pin 29 will be forced out, thus causing the dog 23 to operate the gear 18 ratchet-like in the direction indicated by the broken arrows shown in Fig. 7.

By the above it will be noticed that I can attain either a forward or a backward movement of the device by the operation back and forth of the lever A, depending on which of the dogs 22 or 23 is placed in commission, which latter is attained by revolving the handle C to the point indicated on the dial for that movement.

The duplicate of the mechanism just described is shown in detail in Fig. 5, the two mechanisms being shown in their relative positions in Figs. 4, 8, and 9, whereby they are actuated synchronously to drive their respective pinions 17 and 17', and they in turn the traction-wheels H and H', whereby the mechanism may be propelled forward or backward.

Permanently secured on the member K of the axle K K' is the pinion 31, and alined therewith, but mounted on the member P of the shaft P P', is a clutch-gear. (Shown in detail in Fig. 6.) Said clutch-gear is composed of the following-named members: the hub 35, surrounding and secured to said member P, the two opposite and spaced-apart plates 33 and 34, and the clutch-band 36, carried in a channel formed on the peripheries of the plates 33 and 34 and having the segmental or mutilated gear 32 formed on a portion of its periphery, as shown in Fig. 6. The members 35, 33, and 34 are formed integral with each other, and the members 36 and 31 are also formed integral with each other, all as shown in Figs. 6 and 8. The body of the gear thus formed is held from lateral displacement by a shoulder formed on the left thereof in the member P and by the hanger 14, located on the right thereof, as shown in Fig. 8. By the above it will be observed that the members 35, 33, and 34 of the clutch are connected permanently with the shaft P P', but that the members 32 and 36 are free to revolve independent thereof, but concentric therewith, and on the peripheries of the members 33 and 34, as shown.

It should be noticed that the inner edge of the band 36 is smooth, except in one place, where a square notch 36$^a$ is formed therein, as shown in Fig. 6. Extending across between the plates 33 and 34, extending also from the hub 35 to near the inner edge of the band 36 and spaced apart, are the two abutments 37 and 37', the space between which is substantially the same as is the length of the notch 36$^a$, and mounted to slide between said abutments and filling the entire space formed thereby is the plunger 38, the outer end of which is adapted to enter the notch 36$^a$, whereby the members 36 and 32 may be carried revoluble with the central portion of the clutch. A spring 39 is secured at two points on the outside of the plate 34 and extends through the plate 34 into the plunger 38, in which it is secured, with its resiliency such as to normally retain the plunger 38 out of engagement with the notch 36$^a$. Extending from the inner end of the plunger 38 centerward through an aperture therefor in the hub 35 and the member, opposite thereto, is the pintle 40, which is adapted to impinge the member 2, as shown in Fig. 6. The member 2 at this point is enlarged, with a channel formed almost entirely therearound, in which channel the inner end of the pintle 40 is adapted to travel to keep the plunger 38 out of engagement with the notch 36$^a$; but the member 2 may be revolved to one point, whereby at that point the plunger will be forced outward by the pintle into engagement with the notch 36$^a$.

Formed through the band 36 near its periphery in an axial direction are apertures, as the aperture 36$^z$ in Fig. 6, in one of which may be pivoted the right-angular pivot of the rear end of the connecting-rod 41, the forward right-angular pivot of said rod being mounted in the arm N, above referred to, and as shown in Fig. 4, and by this arrangement it will be seen that the shaft M M' may be partially rotated by the partial rotation of the said segmental gear 32.

Intimately associated with the operation of the clutch mechanism just described and forming a part of the means for raising and lowering the chair which may be carried by this invention are the following: Securely mounted on the outer ends of the shaft K K' are the heads 42 and 42', (shown most clearly in Fig. 4,) each having a round aperture therethrough in an axial direction located near its periphery and also each having a pintle or stop (only one of which appears in the drawings and that one in dotted lines in Fig. 1) extending out at right angles to the axial direction from the periphery of each of said heads. To the heads 42 and 42' are connected the respective rear hangers for the chair 100, which chair is shown in dotted lines in Fig. 1. Said hangers are identical with each other and a description of one will answer for both, the left-hand hanger being denoted by similar numerals with exponents. One of said hangers is shown in detail in Fig. 17 and may be described as follows: The numeral 44 denotes an inverted-U-shaped clip having on one side thereof the bracket 45, with its upper end extending a little thereabove, with a pintle 46 extending outwardly from near the upper end of said bracket and a somewhat smaller pintle 47 extending out from one of the lower corners of the latter, all substantially as shown in said Fig. 17. Secured on the inside of the clip 44 and extending downwardly even with the lower edge of the clip is the spring-fin 48, and on the two lower corners of the fin 48 and on the two lower corners of the inner part of the clip 44 are formed the inwardly and upwardly projecting gibs to engage the under side of the rockers of the chair, all of said gibs being substantially as those shown in Fig. 17. In the center of the top of the hanger described is a thumb-screw 49, with its inner end swivelly carrying the head 50, which latter is provided with a face covered with a soft material to be engaged with and rest tightly on the upper edge of the rocker and when the screw is tightened down to hold said gibs in engagement with the under edge of the rocker. In the center of the outer face of the clip 44 is a threaded thumb-screw 51, which after the hanger has been placed over the rocker may be run in to force the lower edge of the fin 48 against the side of the rocker before the screw 50 is run down in order to bring said gibs to their proper engaging points. The two hangers, as described, are placed in position by inserting their respective pintles 46 and 46' into the apertures formed therefor in the heads 42 and 42', whereby they are eccentrically suspended, as in Fig. 9. From the above it will be seen that if the shaft K K' be rotated the said rear hangers will be alternately raised and lowered.

I will next describe the two front hangers for the chair, which are identical with each other and as shown in Fig. 4, one being shown in detail in Fig. 18, and in their essential particulars are like the said rear hangers. In describing the said front hangers I will refer to the one on the right, and the one on the left will be denoted by similar numerals with exponents.

The numeral 52 designates an inverted-U-shaped clip having secured on one side thereof the bracket 53, extending downward therebelow, as shown in Fig. 18, with a round aperture 54 formed through the lower end portion of said bracket 53 to receive the end of the shaft 13 13', as shown in Fig. 4. Secured on the inside of the clip 52 and extending downward even with the lower edges thereof is the spring-fin 55, and on the two lower corners of the fin 55 and on the two lower corners of the inner lower part of the clip 52 are formed the inwardly and upwardly projecting gibs to engage the under side of the rocker of the chair, which gibs are formed substantially as those shown in Fig. 18. In the center of the top portion of the hanger, as shown in Fig. 18, is a thumb-screw 56, with its lower end swivelly carrying the head 57, which latter has a face covered with some soft material to rest on the upper edge of the rocker and when the screw is turned down to hold the said gibs in engagement with the under edge of the chair-rocker. In the center of the outer face of the clip 32 is a thumb-screw 58, which after the hanger has been placed over the rocker may be run in to force the lower edge of the fin 55 against the side of the rocker. The two front hangers, as described, are placed in position, as shown in Fig. 4.

The numerals 60 and 60' designate the respective right and left arms, having the rear ends thereof hooked under the forward ends of the side bars I and J and immediately in the rear of the vertical hangers I² and J², resting across the horizontal hangers I' and J', and from thence extending forward above and beyond the shaft 13 13' and terminating in the respective heads 61 and 61'. Extending inward toward each other from the heads 61 and 61' are the bars 62 and 62', which bars are extendibly connected together by the ferrule 63. (Shown in dotted lines in Fig. 4.)

Mounted revoluble on the bars 62 and 62' are the brackets 64 and 64', respectively, as shown in detail in Fig. 13, to the faces of which brackets is secured the parallelogram-shaped foot-rest 65. (Shown in Fig. 4.) Adjoining the respective brackets 64 and 64' on their inner ends and also mounted revoluble on the bars 62 and 62' are the collets 66 and 66', each having a set-screw 67 and 67', respectively, extending thereinto at right angles to the axial direction, whereby said collets may be detachably secured to the respective bar members 62 and 62', as shown in Fig. 1. Extending out at right angles to said set-screws and permanently secured in the collets are oppositely-disposed pintles 68 and 68', extending from the right-hand collet, and the pintles 69 69', extending from the left-hand collet.

From the above it will be apparent that the foot-rest is pivotedly mounted; but its movements are limited by the said pintles, which extend out from the said collets, it being understood that said collets may be adjusted to give the desired inclination to the foot-rest, the object of this particular construction being to prevent the foot-rest from being rigid and to provide means whereby a proper ankle movement may be had by the occupant of the chair carried by the invention.

Operation: From the above description it is manifest that I am enabled to accomplish the objects and movements previously referred to, which may be briefly described as follows: By loosening the nuts 10, 10′, and 10″ the device may be adjusted laterally to adapt it to various widths of chairs—for instance, the chair 100 (shown in Fig. 1)—and the front and rear clamp-hangers for the rockers are then secured to the rockers of the chair, as shown in said view, after which the nuts 10, 10′, and 10″ are tightened to hold the device from lateral displacement. After the above-named adjustments are accomplished it will be noticed that by turning the handle C to bring the pointer D to the groove 1 of the dial the plunger 38 will by this movement engage in the notch 36ª, and then by moving forward on the lever A the band 36, operating the gear 32, will draw rearward the rod 41, which operates the arm N, which in turn will rotate rearward the shaft M M′, which movement will first engage the pawls 14 14′ in connection with the notches of the arms 12 12′ to prevent said arms from sliding rearward and also securely locking and holding the forward portions of the rockers at this elevation—that is, at the elevation at which they should happen to be when this movement should take place, or, in fact, at the elevation at which the front portions of the rockers are in when said pawls are caused to engage. Immediately following said operation, and being accomplished by the same movement of the lever continuing on forward, the gear 32 will be turned forward and upward in the direction shown by the solid arrows in Fig. 6, which will revolve the pinion 31, which latter in turn will revolve the shaft K K′, whereby the heads 42 42′ will be turned, bringing the pintles 46 46′ slightly beyond their center to lock and support the device at this point by bringing the stops 43 into contact with the pintles 47, which operation will elevate the rear portion of the rockers, and, as the front portions of the rockers have just previously been secured and supported, thereby raising the chair from the floor to the position as shown in Fig. 1, where it is locked, while other movements may be made with the lever. Now by turning the handle C to bring the pointer D to the groove F the plunger 38 will thereby be withdrawn from the notch, and the chair will then be left suspended from the device and leaving the gear in the position shown in Fig. 6. By the last-named operation of the handle the pins 29 29′ will be admitted into the crescent channels, thus putting the dogs 22 22′ in contact with the gears on which they operate. Then by operating the lever A forward and backward each backward movement thereof will drive the device forward, of course carrying the chair and the occupant therewith, as the dogs 22 and 22′ will operate ratchet-like on the respective gears 18 18′ to drive forwardly the shaft K K′, on which the rear wheels H H′ are mounted. Now by turning the handle C to bring the pointer D to the groove B the dogs 23 23′, having been allowed by said last movement of the handle to engage the respective gears 18 18′, the pins 29 29′ will be pushed outward, releasing the dogs 22 22′ from their gears, and then by operating the lever A back and forth each forward movement thereof will drive the device backward, as the dogs 23 23′ will operate ratchet-like equally on their respective gears 18 18′ to drive rearwardly the shaft K K′, on which the rear wheels H H′ are mounted. Now by turning the handle C to bring the pointer D to the groove R the dog 22′ will engage the gear 18′ and drive the pinion 17′, revolving the wheel H′ forward, while the wheel H will remain practically stationary or at least unactuated, thus causing the front caster-wheel to turn to the right and moving the device forward and to the right. Now by turning the handle C to bring the pointer D to the groove L the dog 22 will engage the gear 18 and drive the pinion 17, thus revolving the wheel H forward, while the wheel H′ will remain practically at rest, thus causing the front caster-wheels to turn to the left, and thereby moving the device forward and to the left.

It should also be noticed that by the reversal of the operation of raising the chair from the floor it may be lowered thereto and placed in rocking position without interference with the invention, as the chair is rocked as an ordinary rocker, in which position the arms 12 12′ may slide back and forth through the heads 7 7′, while said heads will oscillate as the chair is rocked back and forth upon the floor.

From the foregoing description, taken in connection with the accompanying drawings, the construction and operation of my invention will be readily apparent without requiring further extenuated description, for the invention is quite simple and may be manufactured and sold at a comparatively low price.

While I have illustrated and described the best means now known to me for carrying out my invention in a practical manner, I desire that it be fully understood that I do not restrict myself to the exact details of construction shown and described or to the particular objects stated, but hold that changes and variations in the structural features which would suggest themselves to the mechanic would clearly fall within the limits and scope of my invention.

Having now fully shown and described my invention and its intended operation, what I claim as new, and desire to secure by Letters Patent of the United States of America, is—

1. A chair-truck having in combination, means whereby the width of the truck may be adjusted and secured in its adjusted relations, means for mounting a rocking-chair on the truck to be carried thereby, whereby the chair may be rocked upon a floor in the ordinary manner without interference by the truck mechanism, a lever located within reach of the occupant of the chair for actuating the various movements of the truck, means located on said lever for predetermining the movements to be made by the truck, means for raising the chair from the floor by the operation of said lever, means for propelling the truck forward or backward or forward and to the left or right by the operation of said lever, and means for initiating said movements by the handle of said lever, all substantially as shown and described.

2. A chair-truck mounted on four traction-wheels, the front wheels being caster-wheels, an extendible shaft connecting the front wheels, an extendible shaft connecting the rear wheels, an auxiliary extendible shaft located forward of the rear wheels, an inner extendible shaft contained in the auxiliary shaft, a lever attachable to either end of the auxiliary shaft, an inner shaft 5 extending through said lever and connected at its upper end to a handle, gears for connecting the lower end of the shaft 5 to said inner shaft of the auxiliary shaft, a pair of gear-clutches mounted on the auxiliary shaft and operative in mesh with pinions mounted on the rear shaft, a handle mounted on the upper portion of the lever and connected to said shaft 5 to actuate said gear-clutches to operate the truck forward, backward, to the right or to the left by the movement of said lever backward and forward, and a third gear-clutch mounted on the auxiliary shaft which clutch may also be actuated by said inner shaft, and means for predetermining all of said movements by the rotation of the handle of the lever, all substantially as shown and described.

3. The combination with a chair, a framework mounted on four supporting-wheels the forward of which are swivelly mounted, a shaft for each pair of wheels, means for securing the chair at four points near said wheels, a third shaft carrying three clutches, means within the last-named shaft for operating said clutches, one to raise and lower the chair, the other two to move the device forward or backward, means for operating one of or the other of two of the clutches to move the device forward and to the right or forward and to the left, a lever by the operation of which each of said movements is accomplished, and a handle operative on said lever to bring into action each of said movements as desired, all substantially as shown and described.

4. A chair-truck and means whereby it may be operated, consisting in combination with a chair haveig rockers, of a truck mounted on supporting-wheels, means for connecting the chair on the truck, means for raising and lowering the chair, means for propelling the truck forward or backward or forward and to the right or left at the will of the occupant of the chair, a lever located within access of the occupant of the chair for actuating said means, a handle mounted on the lever having means whereby either of said movements may be initiated, a foot-board carried by the truck and located in front of the chair for the feet of the occupant thereof, and means whereby the foot-board may be rocked to impart an ankle movement to the occupant of the chair, all substantially as shown and described.

5. In a mechanism of the character described having in combination with a chair provided with rockers, a truck mechanism consisting of two side bars spaced apart, extensible axles connecting said bars, a carrying-wheel mounted on each end of the rear axle, a pair of caster-wheels supporting the front axle, means carried by the front axle carrying the front portions of the chair-rockers and for securing the front portions of the rockers at various elevations, hangers carried by the rear axle for eccentrically mounting the rear portions of the chair-rockers, and intermediate axle-carrying gear-clutches, a lever connected to either end of said intermediate axle for operating said clutch-gears, a handle mounted on said lever for bringing into operation the movements for which said clutches are susceptible, and a foot-board pivotally mounted in front of the chair carried by the mechanism, all substantially as shown and described and for the purposes set forth.

6. A chair-truck and self-contained propelling means therefor consisting in combination of a truck mounted on wheels, an operating-lever, a revoluble handle therefor, means for operating the truck mechanism forward, backward, to the right or to the left, and for raising and lowering a chair which may be mounted on the truck, all by the operation of said lever forward and backward, each of said operations being initiated and predetermined by revolving said handle to certain indicated points therefor, and means for supporting a chair upon said truck, all substantially as shown and described.

7. In a mechanism of the character described, the combination with a chair provided with rockers, of the truck mounted on carrying-wheels, means for connecting the chair-rockers to the truck, an operating-lever, a handle revoluble around the upper end portion of the lever to control the various operations, means for moving the truck forward or backward or to the right or left by the operation of said lever back and forth, means for raising and lowering the chair with reference to the truck also by the operation of said lever as before, and means for determining either of said movements by the point to which said handle is turned.

8. A chair-operating mechanism consisting in combination with a chair of a truck mounted on wheels, means for connecting the chair to the truck, a pair of gear-clutches for causing the device to move forward or backward, means for operating said clutches to raise and lower the chair, and means for predetermining all of said movements, and means for actuating all of said movements by the operation of a single lever in the hand of the occupant of the chair, all substantially as shown and described.

9. In combination with a rocking-chair, a truck mounted on wheels, means by which the truck may be secured to the chair-rockers without marring the chair, a lever extending up from the truck to within reach of the occupant of the chair, a handle revolubly mounted on the lever, a dial permanently mounted to the lever and having characters on its face to designate each a separate movement to be accomplished by the operation of the lever, a pointer carried by said handle and adapted to pass over the face of said dial when the handle is revolved, means by which the chair may be raised from the floor by the operation of said lever after said handle has been turned to the point indicated therefor, means by which the truck may be propelled forward by the operation of said lever after said handle has been turned to the point indicated therefor, means by which the truck may be propelled backward by the operation of said lever after said handle has been turned to the point indicated therefor, means whereby the truck may be propelled forward and to the left by the operation of said lever after said handle has been turned to the point indicated therefor, means whereby the truck may be propelled forward and to the left by the operation of said lever after said handle has been turned to the point indicated therefor, all of said operations being possible while the operator is seated in the chair carried by the truck.

10. A chair-truck comprising in combination, the frame, the traction-wheels on which the truck is mounted, means for adjusting the width of the frame, means for detachably securing a rocking-chair on the truck, an adjustable foot-rest carried by the truck, adjustable means by which the foot-rest may be given a limited rotary motion, means for raising and lowering the chair from and to the floor after the chair is secured to the truck, and means by which the truck may be moved forward and backward and forward to the right and left at the will of the occupant of the chair.

11. In a device of the character described, the combination with a rocking-chair, a truck mounted on supporting-wheels, means for detachably connecting the chair to the truck, an operating-lever extending upward to be in reach of the occupant of the chair, a handle mounted revoluble to the upper portion of said operating-lever to initiate the various operations, means for propelling the truck forward, backward, to the right or to the left by the operation of said lever back and forth, means for raising and lowering the chair by the operation of said lever as before, and means for predetermining each of said movements by the point to which said handle is turned which last-named means includes a pointer and a dial.

In testimony whereof I have hereunto signed my name, in the presence of two subscribing witnesses, at Richmond, Indiana, this the 9th day of October, 1905.

THOMAS E. WILLIAMS.

Witnesses:
R. E. RANDLE,
ROBT. W. RANDLE.